(12) United States Patent
Manolov

(10) Patent No.: US 7,634,483 B2
(45) Date of Patent: *Dec. 15, 2009

(54) CASCADE DELETE USING A BACKWARD REFERENCE PERSISTENT DATA TARGET OBJECT WITHIN A UNIDIRECTIONAL RELATIONAL DATABASE RELATIONSHIP

(75) Inventor: Svetoslav Manolov, Sofia (BG)

(73) Assignee: SAP AG, Walldorf (DE)

( * ) Notice: Subject to any disclaimer, the term of this patent is extended or adjusted under 35 U.S.C. 154(b) by 79 days.

This patent is subject to a terminal disclaimer.

(21) Appl. No.: 11/270,961

(22) Filed: Nov. 9, 2005

(65) Prior Publication Data
US 2006/0123023 A1   Jun. 8, 2006

Related U.S. Application Data

(62) Division of application No. 10/836,681, filed on Apr. 30, 2004.

(51) Int. Cl.
*G06F 17/30* (2006.01)
(52) U.S. Cl. ...................... 707/100; 707/101
(58) Field of Classification Search ............... 707/100; 717/108
See application file for complete search history.

(56) References Cited

U.S. PATENT DOCUMENTS

| 7,143,108 B1 * | 11/2006 | George | 707/104.1 |
| 2004/0111701 A1 * | 6/2004 | Beust | 717/108 |

* cited by examiner

*Primary Examiner*—Don Wong
*Assistant Examiner*—Sheree N Brown

(57) ABSTRACT

A method is described for making a change in an object oriented relational database in which objects that represent items of persistent data are related to other objects that represent items of persistent data. The method comprises referring to a backward reference contained in a first object that does not have visibility to a second object that the first object is in a unidirectional relationship with. The first object represents a first item of persistent data. The second object represents another item of persistent data. The backward reference identifies the second object. The method also comprises removing the unidirectional relationship, adding a new unidirectional relationship from a third object to the first object, and modifying the backward reference to identify the third object rather than the second object. A cascade delete method that uses a backward reference is also described.

4 Claims, 7 Drawing Sheets

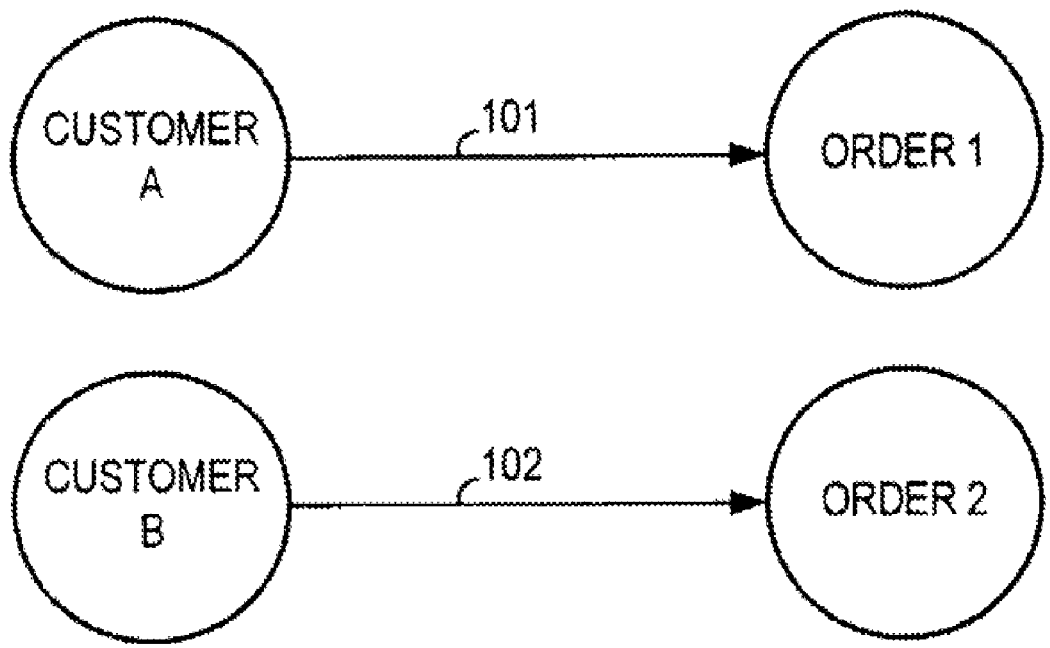
FIG. 1A – Prior Art
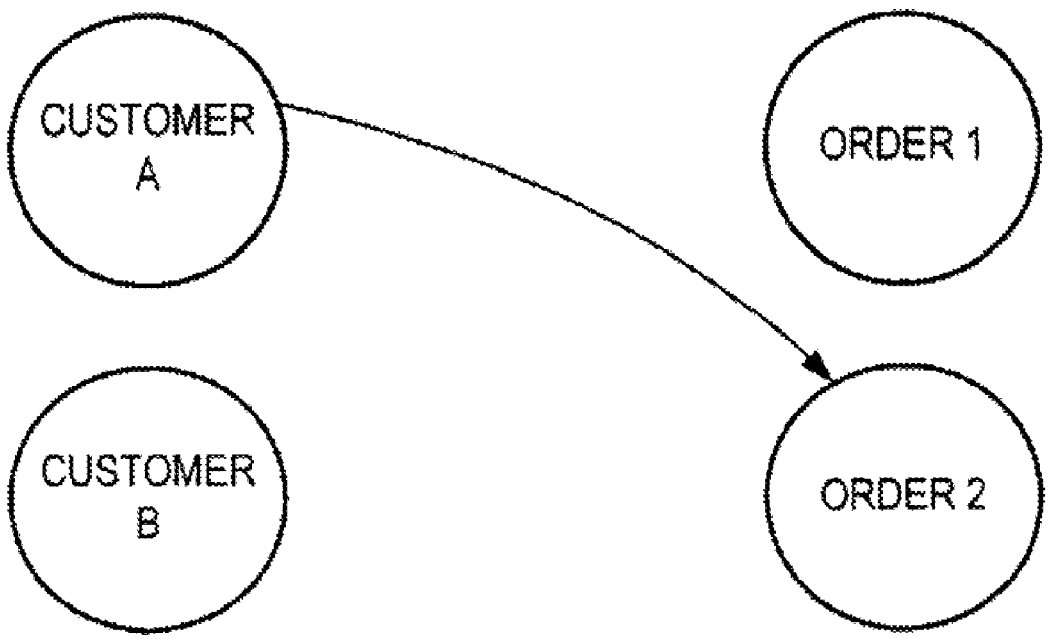
FIG. 1B – Prior Art

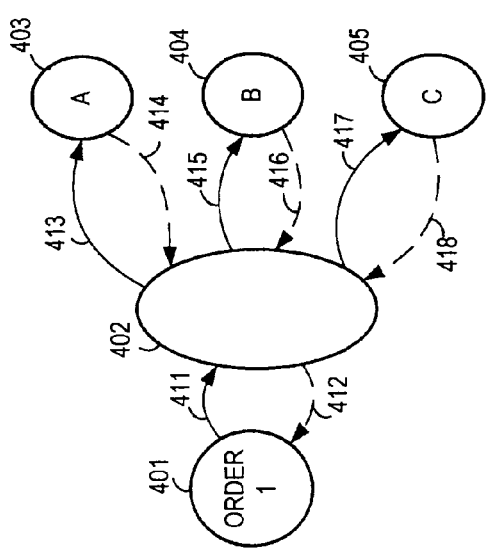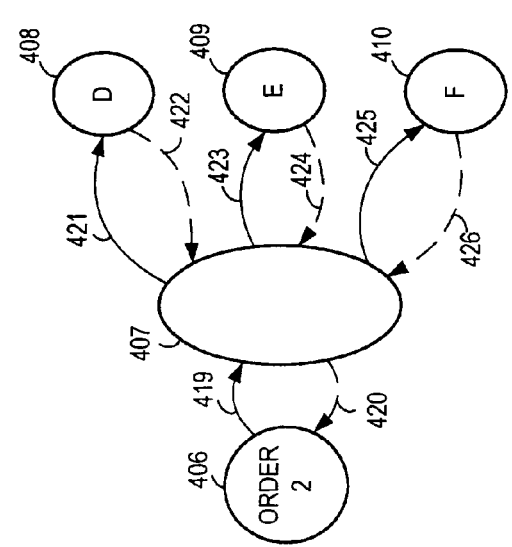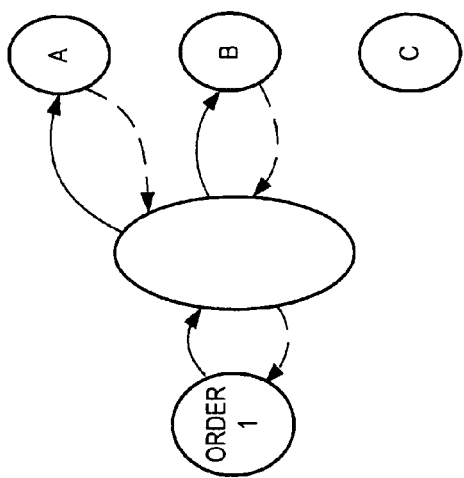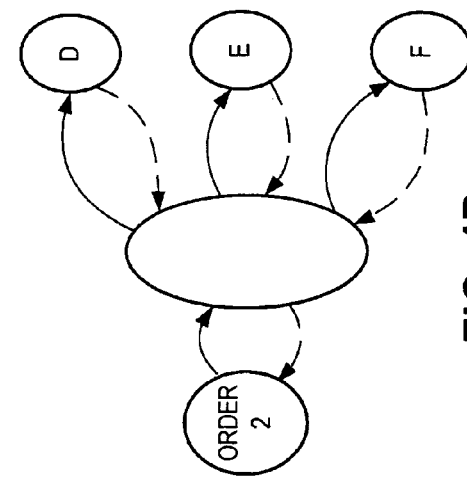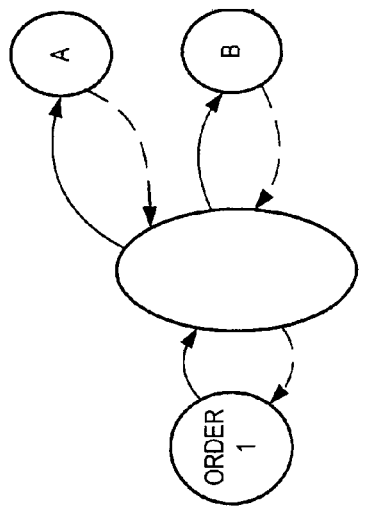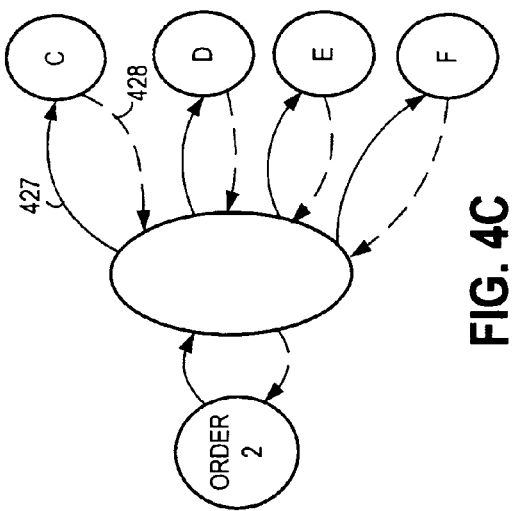
FIG. 4A  FIG. 4B  FIG. 4C

CASCADE DELETE USING A BACKWARD REFERENCE PERSISTENT DATA TARGET OBJECT WITHIN A UNIDIRECTIONAL RELATIONAL DATABASE RELATIONSHIP

This patent application is a divisional of Ser. No. 10/836,681 filed on Apr. 30, 2004, entitled, "BACKWARD REFERENCE IN A PERSISTENT DATA TARGET OBJECT WITHIN A UNIDIRECTIONAL RELATIONAL DATABASE RELATIONSHIP".

FIELD OF THE INVENTION

The field of invention relates generally to relational database management; and, more specifically, to a backward reference in a persistent data target object within a unidirectional relational database relationship.

BACKGROUND

Relational databases are used to define relationships between items of persistent data. For example, FIG. 1a shows a simplistic arrangement of relationships defined within a relational database. Here, an object oriented environment is assumed where first, second, third and fourth objects are used to represent "Customer A", "Customer B", "Order 1" and "Order 2", respectively.

The relational database entries of FIG. 1a can be used, for example, to keep a record of the items purchased for specific customers. Specifically, specific items purchased by Customer A are listed in the "Order 1" object; and, specific items purchased by Customer B are listed in the "Order 2" object. Here, the Customer A object "represents" Customer A and can be assumed to keep various items that identify Customer A (e.g., name, address, phone number, etc.); and, the Customer B object "represents" Customer B and can be assumed to keep various items that identify Customer B (e.g., name, address, phone number, etc.).

Notions of "navigability" come into play in the design of a relational database. Navigability defines the ordered flow in which elements of data within a relational database can be accessed. For example, according to the simplistic relational database entries observed in FIG. 1a, purchased items listed in "Order 1" can be retrieved with the identity of "Customer A" (and purchased items listed in "Order 2" can be retrieved with the identity of "Customer B")—but—the identity of "Customer A" can not be retrieved from the records of "Order 1" (and the identity of "Customer B" can not be retrieved from the records of "Order 2").

Unidirectional relationships 101, 102 enforce the above policy in which information can be obtained in a first direction of object access flow but not in a second. In a typical application, the Customer A object would include information that defines the unidirectional relationship 101 to Order 1 but the Order 1 object would not include any such information (i.e., only the Customer A object has information that corresponds to relationship 101); and, the Customer B object would include information that defines the unidirectional relationship 101 to Order 2 but the Order 2 object would not include any such information (i.e., only the Customer B object has information that corresponds to relationship 102).

In terms used by those in the software arts, it can be said that customer objects have "visibility" to the order objects; but, the order objects do not have "visibility" to the customer objects. Restricting visibility in this manner enforces the unidirectional relationship that is to be implemented into the database. Implementing unidirectional relationships within an object oriented persistent data relational database as described just above can be part of the defined software environment.

For example, the current Java Enterprise Java Bean (EJB) 2.0 specification currently implements a unidirectional relationship by instantiating "accessor" methods in an object having visibility to another object in a unidirectional relationship—but not instantiating such accessor methods in the other object that does not have visibility to the object. A first type of accessor method, referred to as a "set" method, is used to create or change a relationship. A second type of accessor method, referred to as a "get" method, give access to another object from the object that executes the accessor method. The EJB 2.0 specification provides as part of its container managed persistence (CMP) for both types of accessor methods and specifies that objects representing items of persistent data are implemented as "entity beans". CMP is a service by which the persistence management of beans within an EJB container are managed by the contained itself.

Implementing a unidirectional relationship where a first object has "visibility" to a second object but the second object does not have "visibility" to the first object can be inefficient, however, when changes are to be made to existing relationships between existing objects. For example, consider if the working environment of the relational database of FIG. 1a is that: 1) there is to be only one customer per order; and, 2) there are high priority customers and low priority customers where high priority customers are given access to items in shortage over low priority customers.

If Customer A is a high priority customer and Customer B is a low priority customer; and if, Order 2 has every item in Order 1 and includes an item in shortage; then, if Customer A suddenly updates his items for purchase to include the item in shortage, Customer A may be satisfied by "taking" Order 2 from Customer B and dropping Order 1. FIG. 1b represents the resulting object relationships.

Implementing the change, however, can be inefficient because of the lack of visibility that Order 2 had to Customer B in the original set of relationships in FIG. 1a. For example, assume the change is implemented by: 1) first searching through all order objects (which could be many more than those observed in FIG. 1a) to find an order that "matches" the needs of Customer A (to which Order 2 will be a "hit"); and, then, 2) establishing the new relationship if the customer of an object identified through 1) is lower priority than Customer A.

Because of the lack of visibility that Order 2 has with respect to Customer B, the second step 2) above can only be accomplished by searching through all customer objects (which again can be many more than those observed in FIG. 1a) to find "the object" (Customer B) that is related 102 to Order 2 so as to resolve the customer priority issue. Thus, as searches can be time consuming, the lack of visibility from Order 2 to Customer B causes changes to be inefficiently implemented when an object whose relationship to be changed (in this case Order 2) is identified before its relationship companion (in this case Customer B); and, the first identified object does not have visibility to the companion.

SUMMARY

A method for making a change in an object oriented relational database in which objects that represent items of persistent data are related to other objects that represent items of persistent data. The method comprises referring to a backward reference contained in a first object that does not have visibility to a second object that the first object is in a unidirectional relationship with. The first object represents a first item of persistent data. The second object represents another item of persistent data. The backward reference identifies the second object. The method also comprises removing the unidirectional relationship, adding a new unidirectional relationship from a third object to the first object, and modifying the backward reference to identify the third object rather than the second object. A cascade delete method that uses a backward reference is also described.

FIGURES

The present invention is illustrated by way of example and not limitation in the figures of the accompanying drawings, in which like references indicate similar elements and in which:

FIGS. 1a and 1b shows a change made to relational database of persistent data;

FIGS. 4a through 4c show another database change made with the use of a backward reference;

DETAILED DESCRIPTION

Figure 2A:
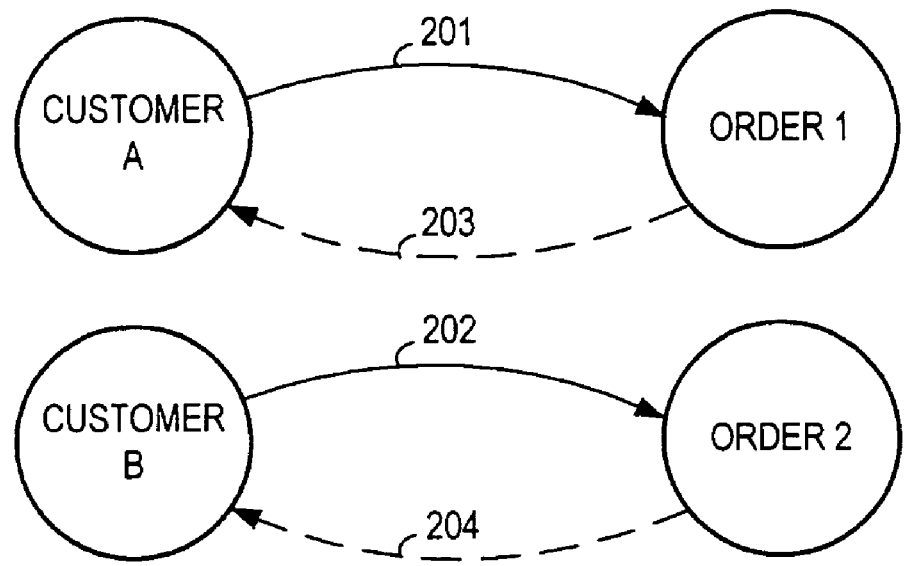
FIG. 2a shows the relationship of FIG. 1a where the objects that lack visibility to their companion objects include backward references to their companion.
Figure 2B:
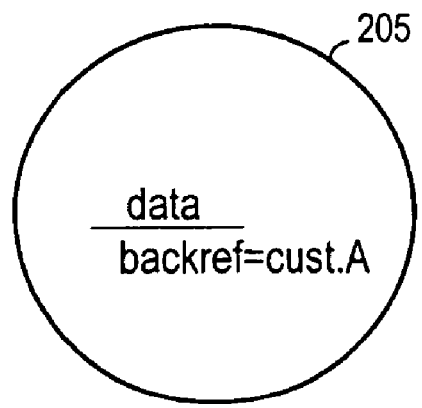
FIG. 2b shows an object that lacks visibility to its companion object including a backward reference to its companion object.

A solution to the problem of finding a relationship companion to an object that does not have visibility to its relationship companion is to include a "backward reference" into the object that lacks visibility to its relationship companion. FIG. 2a shows an implementation of backward references applied to the situation of FIG. 1a. FIGS. 3a through 3d show a method for making the database change of FIGS. 1a and 1b using backward references. FIG. 2b shows an object 205 including a backward reference.

A backward reference is a reference to a relationship companion within an object; where, the object does not have visibility to the relationship in light of the navigability rules that apply. Referring to FIG. 2a, unidirectional relationships 201, 202 are defined from the Customer A and Customer B objects to the Order 1 and Order 2 objects, respectively. However, the "target" order objects of these unidirectional relationships 201, 202 include backward references 203, 204 to their corresponding companions. That is, the Order 1 object includes a backward reference 203 to the Customer A object and the Order 2 object includes a backward reference 204 to the Customer B object.

Note that the implementation of the backward references 203, 204 into the order objects does not interfere with the "designed-for" navigability principles of the database. That is, for example, the Customer A and Customer B objects would include accessor methods but the Order 1 and Order 2 objects would not. As such, during a normal flow of use of the database (i.e., when a change to the database is not being made), purchased items listed in "Order 1" can be retrieved with the identity of "Customer A" (and purchased items listed in of "Order 2" can be retrieved with the identity of "Customer B")—but—the identity of "Customer A" can not be retrieved from the records "Order 1" (and the identity of "Customer B" can not be retrieved from the records of "Order 2").

FIG. 2b shows an exemplary depiction of how a backward reference could be implemented into the Order 2 object of FIG. 2a. According to the depiction of FIG. 2b, the Order 2 object includes in a data field a backward reference that identifies the Customer B object ("back ref=cust. B"). The identification could be made, for example, with the name of the Customer B object. As is known in the art, in an object-oriented environment, an object may be made to contain both methods and data. Here, note that the Order 2 object is drawn so as not to include any accessor methods for a relationship with Customer B (thus the object does not have visibility to Customer B during normal usage of the database) but does nevertheless identify the Customer B object in the backward reference that is found in a data field of the object.

Figure 3A:
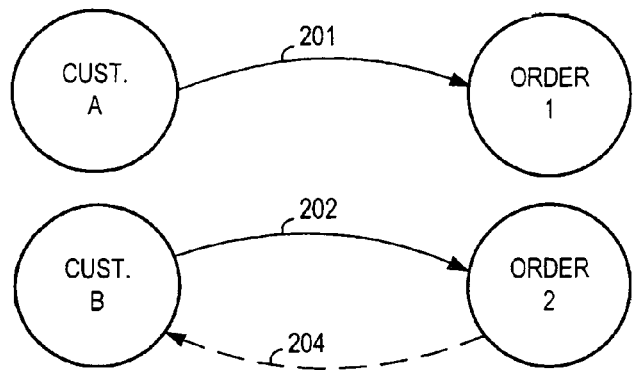
FIGS. 3a through 3d show a method for implementing the change of FIGS. 1a and 1b with the use of a backward reference.

As observed in FIGS. 3a through 3d, the backward reference is used if a change is to be made to the database that involves the Order 2. FIG. 3a show partial results of the following process used to change the database as observed in FIGS. 1a and 1b. Recall that the change of FIGS. 1a and 1b involves a situation in which Customer A is to "take" Order 2 and "drop Order 1"; and, initially only Customer A and Orders 1 and 2 are "known". That is, because Customer A has visibility to Order 1; and, because Order 2 is known to satisfy the requirements of Customer A (having an item in shortage), each of the Customer A and Order 1 and Order 2 objects are "known". However, Customer B is not known because of the lack of visibility that Order 2 has to Customer B.

Figure 3B:
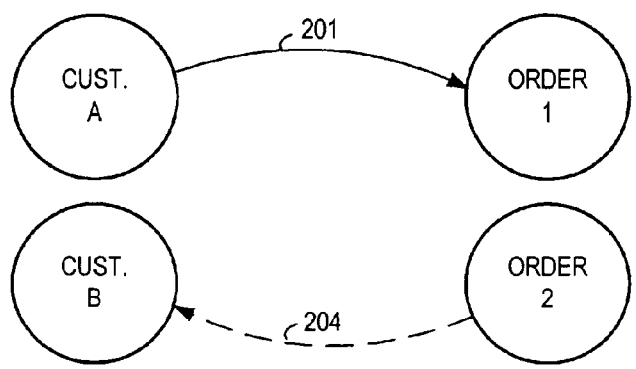
Figure 3C:
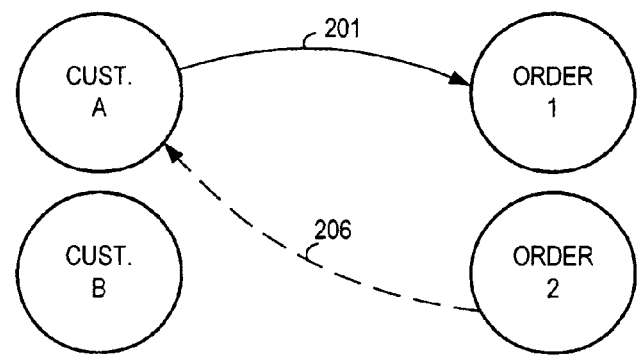
Figure 3D:
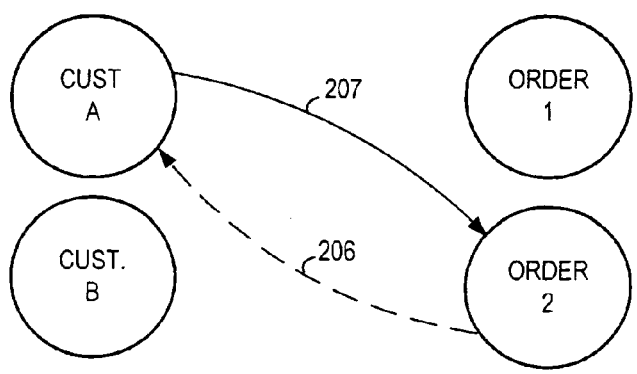

According to the database change procedure of FIGS. 3a through 3d: 1) the visibility of Customer A to Order 1 is used to reference Order 1 and remove its backward reference 203 to Customer A (FIG. 3a); 2) the backward reference 204 from Order 2 to Customer 2 is used to identify Customer B and remove Customer B's unidirectional relationship 202 with Order 2 (FIG. 3b); 3) the backward reference 206 of Order 2 is changed so as to identify Customer A instead of Customer B (FIG. 3c); and, the unidirectional relationship 201 of Customer A to Order 1 is replaced with a unidirectional relationship 207 to Order 2 (FIG. 3d).

Removing the backward reference 203 from Order 1 to Customer A first, as observed in FIG. 3a, effectively prevents Customer A from being identified in another change process to the larger database (not shown). Thus if Order 1 becomes a "hit" for another search, the Customer A object is not invoked. Here, it is known that Order 1 does not satisfy the requirements of Customer A, therefore, its is known that Customer A will no longer be in a relationship with Order 1 (assuming no mechanism exists to keep Customer A with Order 1 if the desired item in shortage cannot be found for Customer A).

Here, assume that it is not yet known exactly which other order Customer A will "take" in order to satisfy Customer A. That is, for example, perhaps multiple orders (not shown) came up as "hits" when the pool of order objects were searched to identify those objects that included all items needed by Customer A. As such, the unidirectional relationship 201 from Customer A is not yet changed because it is not yet known to which object the new unidirectional relationship from Customer A will point.

The referring to the backward reference of Order 2 as observed in FIG. 3b, allows the Customer B object to be identified and compared as to its priority with Customer A. It may be assumed that Customer B is the first "competing" customer of Customer A to be analyzed; or, that multiple customer objects have already been compared having equal or higher comparison to Customer A.

FIG. 3b shows the result of Customer B being of lower priority than Customer A because the unidirectional relationship 202 from Customer B to Order 2 has been removed to make room for Customer A to "take" Order 2. FIG. 3c shows the back reference of Order 2 being changed to refer 206 to Customer A rather than Customer B 204. This represents the first physical conscience of a relationship between Customer A and Order 2 as Customer A can now be invoked in any searches upon which Order 2 is a "hit". FIG. 3d shows the unidirectional relationship of Customer A being changed so as to point 207 to Order 2 rather than point 201 to Order 1.

Implementing the backward reference from Order 2 to Customer A (in FIG. 3c) before implementing the unidirectional relationship from Customer A to Order 2 (in FIG. 3d), allows the final change to be the ultimate "sought-after" change: the order of Customer A changing from Order 1 to Order 2.

FIGS. 4a through 4c shows a database change involving an Order 1 object 401 and objects 403, 404, 405 representing ordered items A, B and C respectively; and, an Order 2 object 406 and objects 408, 409, 410 representing ordered items D, E and F respectively. The specific change is that ordered item C is to be removed from Order 1 and added to Order 2. Note that each of the order relationships include corresponding unidirectional relationships 411, 413, 415, 417, 419, 421, 423, 425 and corresponding backward references 412, 414, 416, 418, 420, 422, 424, 426. Each of the order relationships are implemented as "one to many" ("1:M") relationships through the use of a collection object (collection object 402 for Order 1 and collection object 407 for Order 2) that identifies the objects for each of the "many" (M) items of their respective order (i.e., items A, B, C for Order 1 and items D, E, F for Order 2).

Referring to FIG. 4b, the backward reference 418 from the object 405 representing item C and the unidirectional relationship 417 from collection object 402 to object 405 is removed. Here, for example, assume that item C was found in a search and then backward references 418 and 412 were traced backward to the Order 1 object 401 to identify the priority of Order 1 (or the priority of Order 1's customer through a backward reference to a customer object from the Order 1 object 401 (not shown)).

Upon reaching a conclusion that the removal of item C from the Order 1 arrangement was appropriate (e.g., because Order 1 or Order 1's customer was lower in priority than Order 2 or Order 2's customer), FIG. 4b shows the resultant action in which unidirectional relationships 417 and backward reference 418 are removed. FIG. 4c shows completion of the next phase in which a new unidirectional reference 427 is added between the collection object 407 of Order 2 and a backward reference 428 is added to the item C object that identifies collection object 407. Conceivably, backward reference 418 could have been replaced with backward reference 428 as part of the same access to the item C object 405.

Figure 5:
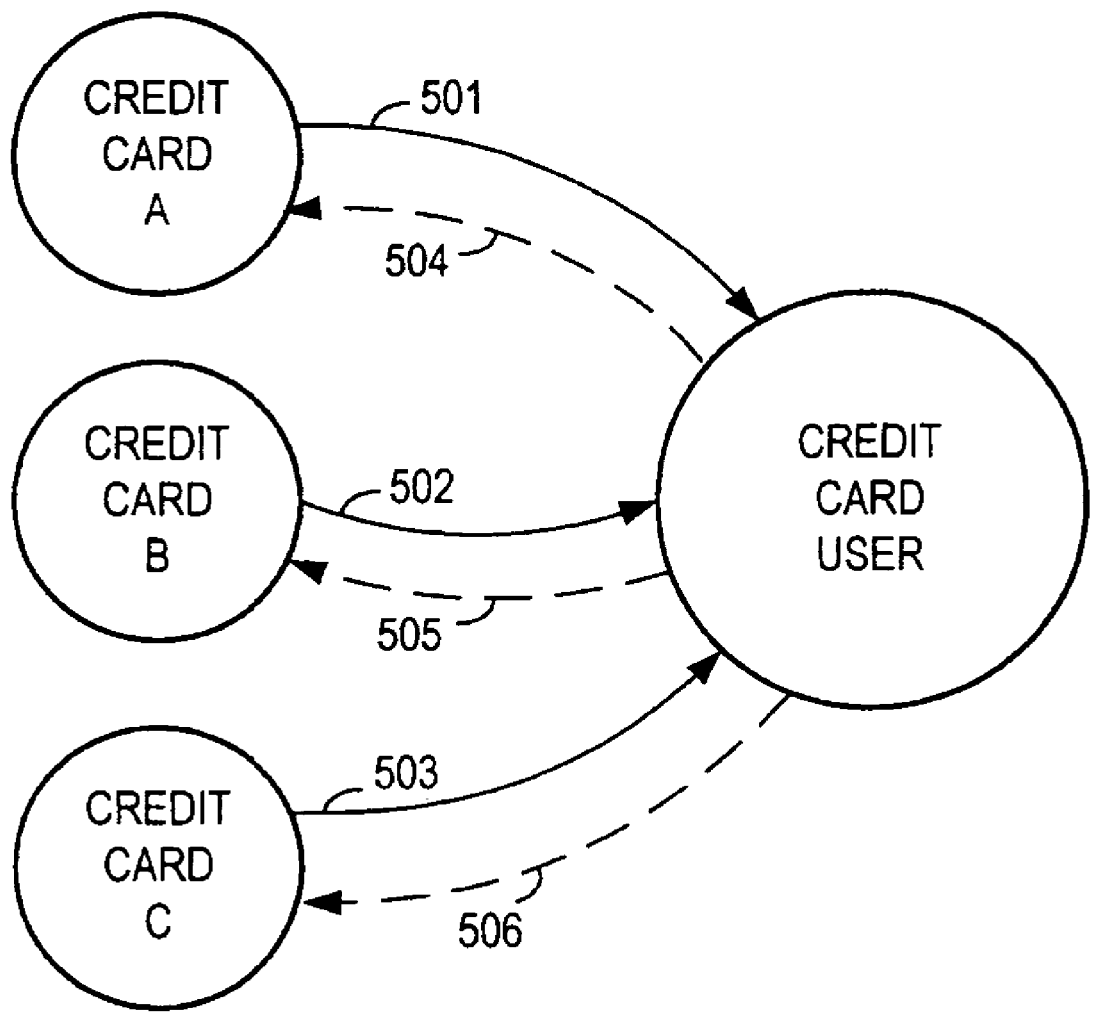
FIG. 5 shows a cascade delete made with the use of a backward reference.

FIG. 5 shows a cascade delete implemented with backward references. FIG. 5 shows an M:1 relationship implemented as multiple credit card objects that each posses visibility to a particular credit card user object through the use of a unidirectional relationship 501, 502, 503. The credit card user object includes a backward reference 504, 505, 506 to each of the credit card objects. The navigability of the relational database scheme of FIG. 5 gives visibility to the credit card objects of the credit card user object but does not give visibility of the credit card user object to the credit card objects.

A cascade delete is a process by which the elimination of an object from a database causes a "ripple effect" whereby other objects that are related to the eliminated object must also disappear (i.e., an inter related network or objects "does not make sense" if a particular object disappears). In the exemplary situation of FIG. 5, the depicted relationship is assumed to "not make any sense" if the credit card user disappears (e.g., if the user is a customer of a bank that issues credit cards A, B and C, the ability to use the credit card is deleted if the user stops being a customer of the bank). Thus, if the object for the credit card user is eliminated so are each of the credit card objects. As such, a cascade delete process is executed in which the backward references 504, 505, 506 of the credit card user object are referred to understand which other objects (in this case, the credit card objects) are to be deleted along with the credit card user object.

Figure 6A:
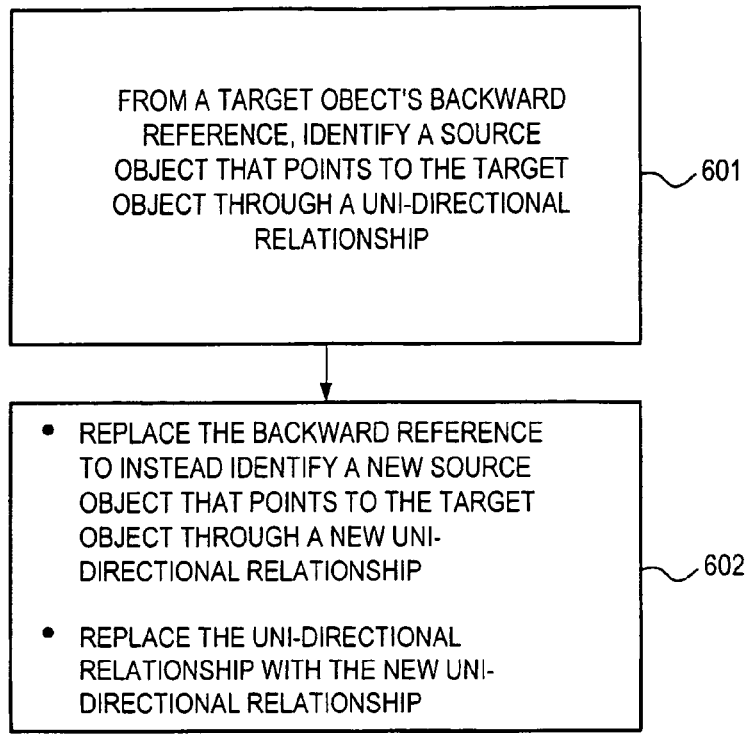
FIGS. 6a and 6b show methodologies made with the use of a backward reference.
Figure 6B:
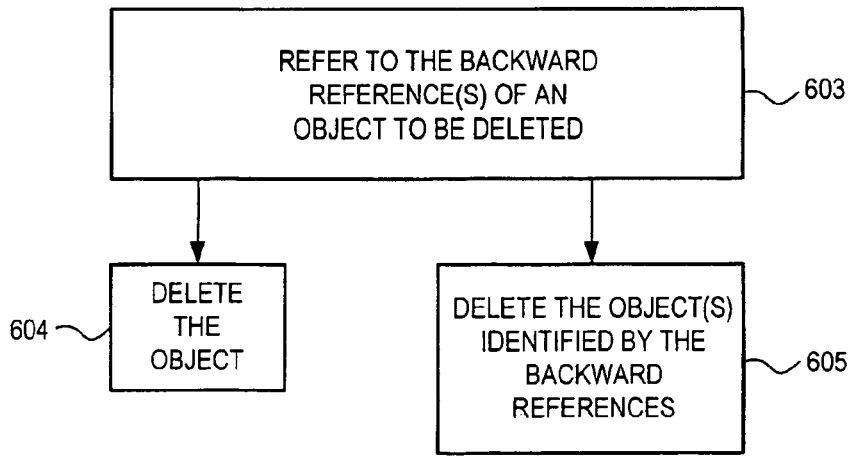

FIGS. 6a and 6b show methodologies that have been discussed above. FIG. 6a shows a methodology that has been taught by the discussion of FIGS. 2a-3d and 4a-4c; and, FIG. 6b shows a methodology that has been taught by the discussion of FIG. 5.

According to the methodology of FIG. 6a, a backward reference found with a unidirectional relationship's target object is used to identify the source object from which the unidirectional relationship originates 601; then, the backward reference is replaced with a new backward reference that identifies a new source object of a new unidirectional relationship that points to the target object and the new unidirectional relationship replaced the old unidirectional relationship with the new unidirectional relationship 602.

According to the methodology of FIG. 6b, the backward reference(s) of an object to be deleted are referred to 603; then the object is deleted 604 as well as the object(s) identified by the backward reference(s) 605.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DYD ROMs, EPROMs, LEPROMs, magnetic or optical cards or other type of machine-readable media suitable for storing electronic instructions.

Figure 7:
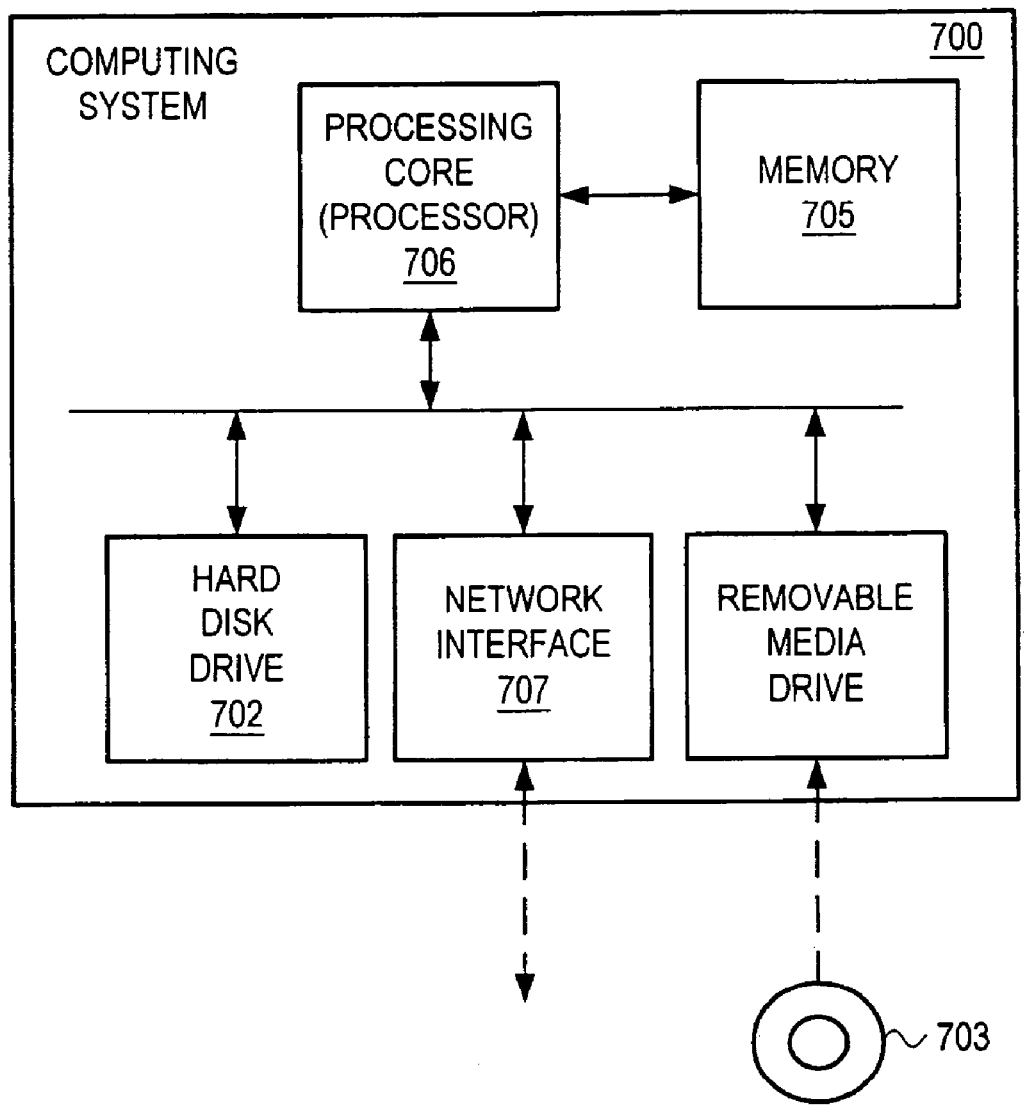
FIG. 7 shows an embodiment of a computing system.

FIG. 7 is a block diagram of a computing system 700 that can execute program code stored by an article of manufacture. It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:

in a runtime environment of a computing system, accessing a data field of a first object to retrieve a backward reference to a second object, the two objects representing items of persistent data and are in a unidirectional relationship in an object oriented relational database wherein the second object points to the first object, further wherein the backward reference does not interfere with the relational database scheme; storing the backward reference in a memory of the computing system; removing the unidirectional relationship from the memory of the computer system by calling a container persistence management function, by which a persistent management of entity beans associated with a container in which the first and the second objects reside is managed; deleting the first object by calling a container persistence management function, by which the persistent management of entity beans associated with the container in which the first object resides is managed; and cascade deleting the second object by accessing the data field of the first object to identify the second object based on the backward reference stored in the data field in the memory of the computing system.

2. The method of claim 1 wherein the method is compliant with a Java standard.

3. A machine readable medium having a machine readable instructions tangibly stored thereon for execution by a machine to perform a method, the method comprising:

in a runtime environment of a computing system, accessing a data field of a first object to retrieve a backward reference to a second object, the two objects representing items of persistent data and are in a unidirectional relationship in an object oriented relational database wherein the second object points to the first object, further wherein the backward reference does not interfere with the relational database scheme; removing the unidirectional relationship from the memory of the computer system by calling a container persistence management function, by which a persistent management of entity beans associated with a container in which the first and the second objects reside is managed; deleting the first object by calling a container persistence management function, by which the persistent management of entity beans associated with the container in which the first object resides is managed; and cascade deleting the second object by accessing the data field of the first object to identify the second object based on the backward reference stored in the data field.

4. The machine readable medium of claim 3 wherein the method is compliant with a Java standard.

* * * * *